United States Patent [19]

Sheen

[11] Patent Number: 4,776,565
[45] Date of Patent: Oct. 11, 1988

[54] WATER FAUCET VALVE

[76] Inventor: Guang Y. Sheen, No.1-2, Lane 23, Yeong Chang Third St., Taichung, Taiwan

[21] Appl. No.: 132,325

[22] Filed: Dec. 14, 1987

[51] Int. Cl.[4] .............................................. F16K 43/00
[52] U.S. Cl. ..................................... 251/310; 251/287
[58] Field of Search ............... 251/208, 286, 287, 310; 137/454.6, 614.11

[56] References Cited

U.S. PATENT DOCUMENTS

| 4,058,289 | 11/1977 | Hicks | 251/310 X |
| 4,700,736 | 10/1987 | Shiem | 251/287 X |
| 4,700,928 | 10/1987 | Marty | 137/454.6 X |

Primary Examiner—A. Michael Chambers
Assistant Examiner—John C. Fox
Attorney, Agent, or Firm—Morton J. Rosenberg

[57] ABSTRACT

A water faucet valve is mounted within a faucet body, in which the faucet body is threaded together with a collar, and the water faucet valve is applied below a handle. The water faucet valve comprises a cap, a valve element and two O-rings. The cap has a hole, a raised channel with a pair of lugs provided below and contacting the raised channel, a groove, and an arced protuberance on the bottom end of the cap. The valve element has a control rod with a tubular member mounted on, and a circular base. The circular base has an arced channel for receiving the arced protuberance, a first outlet port and a first inlet port.

3 Claims, 6 Drawing Sheets

WATER FAUCET VALVE

BACKGROUND OF THE INVENTION

The present invention relates to a water faucet valve, and more particularly relates to a water faucet valve which can be applied in general handles.

Various types of water faucet valve assemblies have been developed in many parts of the world. U.S. Pat. No. 3,645,493 to Manoogian entitled "Faucet Valve" discloses a structure of a handle with an integral depending lug, and discloses a stem structure. The water faucet device cannot be applied in general handles, since the water faucet device requires a handle with a lug. Further, stems with annular grooves are provided in other prior arts. O-rings are disposed on the grooves. The manufacture of molding of the annular grooves is difficult. This results in leaking problems therebetween. The present invention can actually obviate and/or mitigate the above-mentioned drawbacks.

SUMMARY OF THE INVENTION

A primary objective of the present invention is to provide a water faucet valve in which the valve is applied with general handles which have no lugs or other arced protuberances.

Another objective of the present invention is to provide a water faucet valve which is easier to manufacture than previously possible.

Still another objective of the present invention is to provide a water faucet valve, the molding of which is easy to manufacture and which is not subject to leaking problems.

Another objective of the present invention is to provide a water faucet valve which has performance characteristics superior to any heretofore available.

Further objectives and advantages of the present invention will become apparent as the following description proceeds, and the features of novelty which characterize the invention will be pointed out with particularity in the claims annexed to the forming a part of this invention.

DETAILED DESCRIPTION OF THE PREFERRED EMBODIMENT

Figure 1:
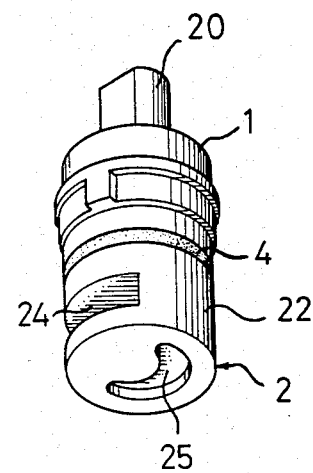
FIG. 1 is a perspective view of a water faucet valve in accordance with the present invention.
Figure 2:
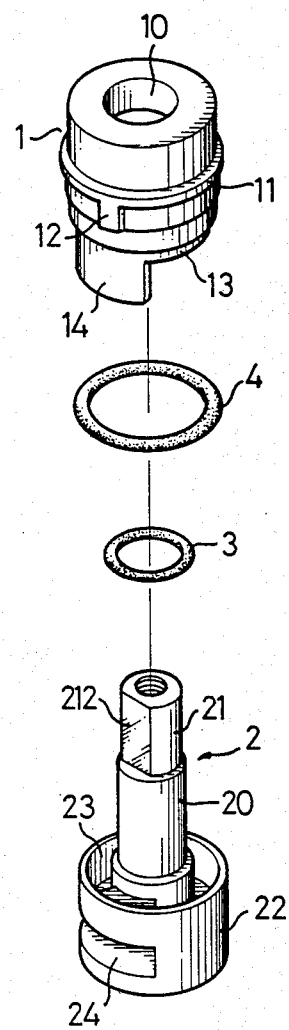
FIG. 2 is an exploded view of the water faucet valve of FIG. 1.

In FIGS. 1 and 2, it can be seen that a water faucet valve in accordance with the present invention comprises a cap 1, a valve element 2 having a control rod 20, and two O-rings 3, 4 thereon. Further referring to FIG. 3, it can be seen that the water faucet valve is mounted in a conventional manner within a faucet body 5 and a collar 6, and is operated by a handle 7.

A hole 10 is positioned at the top center of the cap 1 for receiving the valve element 2, and a raised channel 11 is mounted on the cap 1 for retaining the cap 1 within the collar 6. Provided below and contacting the raised channel 11 are a pair of lugs 12 to prevent any relative rotation between the cap 1 and the faucet body 5. Moreover, a groove 13 and an arced protuberance 14 are provided on the bottom end of the cap 1.

A tubular member 21 with a threaded hole at its central portion is mounted on the top end of the control rod 20 for receiving the handle 7. The tubular member 21 has a substantially circular shape with a flat edge 212, and is threaded within the handle 7 by a screw 71. The tubular member 21 prevents any relative motion between the valve element 2 and the handle 7.

The valve element 2 has a circular base 22 with an arced channel 23 for the arced protuberance 14 to rotate in. Below the channel 23, a first outlet port 24 is provided at the exterior of the base 22 and communicates with a kidney-shaped first inlet port 25 at the bottom surface of the base 22. Positioned between the cap 1 and the control rod 20, O-ring 3 effectively forms a seal therebetween. Similarly, O-ring 4, disposed on the groove 13, effectively forms a seal between the cap 1, the valve element 2 and the faucet body 5.

Figure 3:
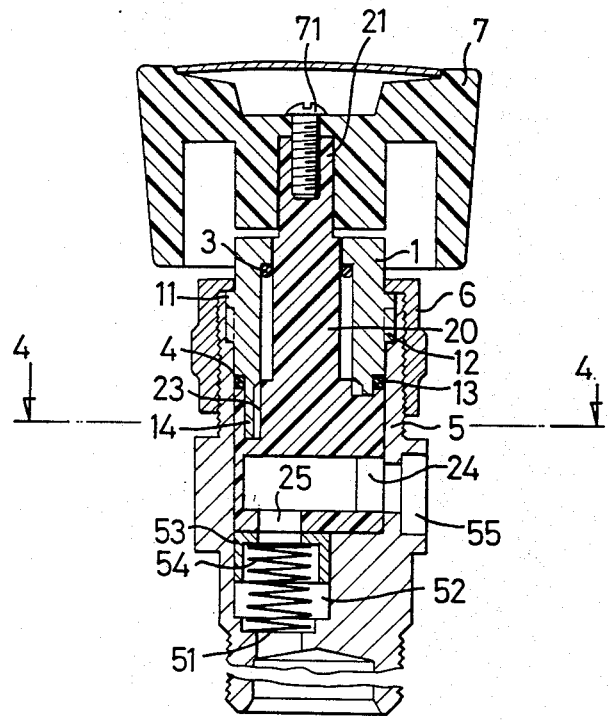
FIG. 3 is a vertical sectional view of the water faucet valve of FIG. 1 mounted within a faucet body, illustrating the valve in its full open position.

FIG. 3 illustrates the water faucet valve in its full open position. A second inlet port 51 is, in a known construction, laterally offset from the axis of the faucet body 5 and communicates with the first inlet port 25 through a water passage 52. With a sealing member 53 disposed contacting the bore of the water passage 52, a spring 54 is provided within the sealing member 53. In alignment with the first outlet port 24, a second outlet port 55 is provided at the exterior of the faucet body 5.

Since the upper exterior of the faucet body 5 is threaded, the faucet body 5 receiving the cap 1 threadably engages with the threaded collar 6. This results in the cap 1 and the faucet body 5 being tightly combined together.

Figure 4A:
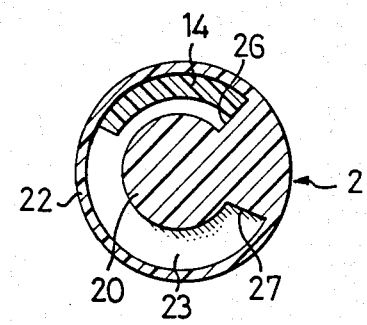
FIG. 4A is a cross-sectional view taken along line 4—4 of FIG. 3.
Figure 4B:
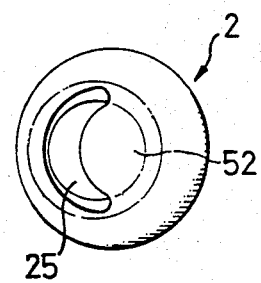
FIG. 4B is a bottom view corresponding to FIG. 4A.

FIG. 4A illustrates the arced protuberance 14 in contact with a first side 26 of the valve element 2 while the valve is in its full open position. Further, FIG. 4B shows the situation of the water passage 52, indicated in dotted lines, being in register with the first inlet port 25.

Figure 5:
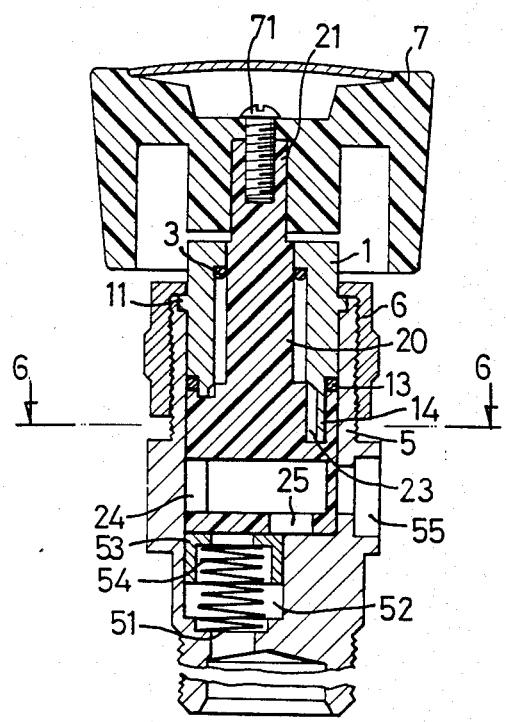
FIG. 5 is a vertical sectional view, similar to FIG. 3, but illustrating the valve in its closed position.

As the handle 7 is rotated to the extreme counterclockwise (CCW) position, it can be seen in FIG. 5 that the valve is in closed position. The first inlet port 25 is not in register with the water passage 52, and the sealing member 53 is urged upwardly against the bottom surface of the base 22 by the spring 54. This prevents the water from flowing into the first inlet port 25.

Figure 6A:
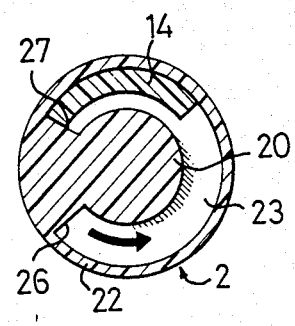
FIG. 6A is a cross-sectional view taken along line 6—6 of FIG. 5.
Figure 6B:
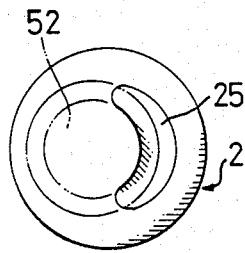
FIG. 6B is a bottom view corresponding to FIG. 6A.

Corresponding to FIG. 5, FIG. 6A illustrates the arced protuberance 14 in contact with a second side 27 of the valve element 2. Further, FIG. 6B shows the condition in which the water passage 52, indicated in dotted lines, is not in register with the first inlet port 25.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A water faucet valve being mounted within a faucet body (5), wherein said faucet body (5) is threaded together with a collar (6), and said water faucet valve is operated by a handle (7); the improvement in said water faucet valve comprising:

(a) a cap (1) having a hole (10) at a top center thereof, a raised channel (11) which retains said cap (1) within sad collar (6), a pair of lugs (12) provided below and contacting said raised channel (11) for preventing relative rotation between said cap (1) and said faucet body (5), a groove (13), and an arced protuberance (14) on a bottom end thereof;

(b) a valve element (2) having a control rod (20) with a tubular member (21) mounted thereon for receiving said handle (7); said valve element (2) having a circular base (22); said base (22) having an arced channel (23) for receiving said arced protuberance (14); a first outlet port (24) being provided at an exterior of said base (22); said first outlet port (24) communicating with a first inlet port (25) at a bottom of said base (22);

(c) an O-ring (3) being positioned between said cap (1) and said control rod (20); said O-ring (3) forming a seal between said cap (1) and said control rod (20); and (d) an O-ring (4) being positioned on said groove (13) for forming a seal between said cap (1), said valve element (2), and said faucet body (5).

2. A water faucet valve according to claim 1 wherein said first inlet port (25) is kidney-shaped.

3. A water faucet valve according to claim 1 wherein said tubular member (21) has a substantially circular shape with a flat edge (212).

* * * * *